United States Patent [19]

Aine

[11] 3,835,491
[45] Sept. 17, 1974

[54] TRAILERABLE BOAT FOR A CAMPER AND METHOD FOR TRANSFERRING THE CAMPER

[76] Inventor: Harry E. Aine, 675 Sharon Park Dr. No. 201, San Mateo County, Calif. 94025

[22] Filed: Feb. 1, 1971

[21] Appl. No.: 111,364

[52] U.S. Cl. .................................................. 9/1 T
[51] Int. Cl. ........................................... B63c 13/00
[58] Field of Search .......... 9/1 R, 1 T; 114/.5 F, 56, 114/61, 65 R; 115/.5 A, 1 R, 1 A, 1 B; 280/414 R, 414 A, 414 B; 296/23 MC, 23 B, 23 R; 214/515; 254/45

[56] References Cited
UNITED STATES PATENTS

| | | | |
|---|---|---|---|
| 2,199,186 | 4/1940 | Quintana | 115/.5 A |
| 2,308,109 | 1/1943 | Rundquist | 9/1 R |
| 2,588,084 | 3/1952 | Bushfield | 9/1 T |
| 2,834,599 | 5/1958 | Sarchet | 214/515 X |
| 3,148,795 | 9/1964 | Leach | 214/515 |
| 3,186,570 | 6/1965 | Bunnell | 214/515 |
| 3,335,437 | 8/1967 | Judkins | 9/1 T |
| 3,382,836 | 5/1968 | Hume | 115/1 R |
| 3,414,916 | 12/1968 | Martin et al. | 9/1 T |
| 3,426,716 | 2/1969 | Hackworth | 114/61 |
| 3,436,774 | 4/1969 | Schmitz | 9/1 T |
| 3,629,884 | 12/1971 | Brown | 9/1 T |
| 3,657,751 | 4/1972 | Shaw | 9/1 R |
| 3,673,622 | 7/1972 | Allen | 9/1 T |

Primary Examiner—Duane A. Reger
Assistant Examiner—Galen L. Barefoot

[57] ABSTRACT

The camper body is transferred from the bed of a truck to a trailered foldable pontoon boat by attaching a pair of lifting beams across opposite ends of the camper body. Four jacks, one attached to each end of the lifting beams, serve to lift the camper from the bed of the truck. The camper is lifted a sufficient amount such that the truck can pull forward and pull a camper body platform, provided on the trailered boat, into position below the camper body. The camper body is then lowered onto the platform and locked into position on the boat. The platform has a height sufficient to provide a pilot house region under the cab-over portion of the camper body. A collapsible wind screen is attached between the cab-over portion and the deck of the boat to screen off the pilot house. Seats are provided in the camper body platform such that when the camper is not in use the platform provides a plurality of passenger seats.

24 Claims, 17 Drawing Figures

3,835,491
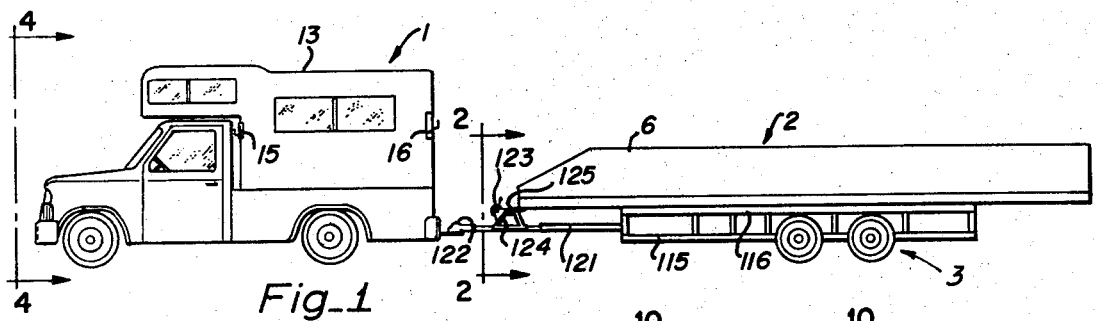
Fig_1
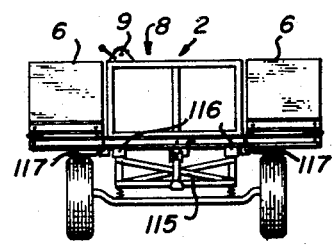
Fig_2
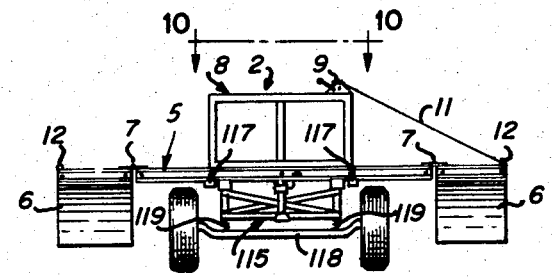
Fig_3
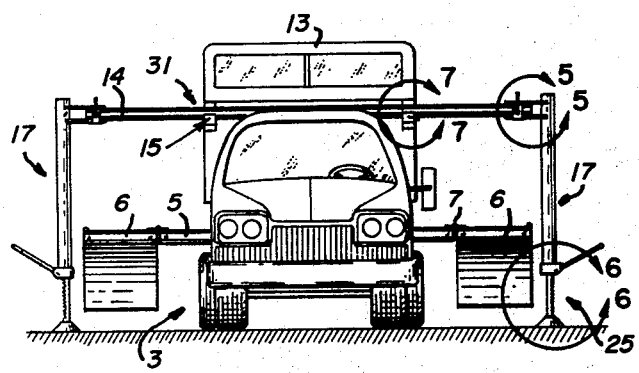
Fig_4
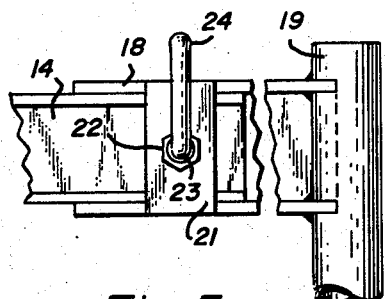
Fig_5
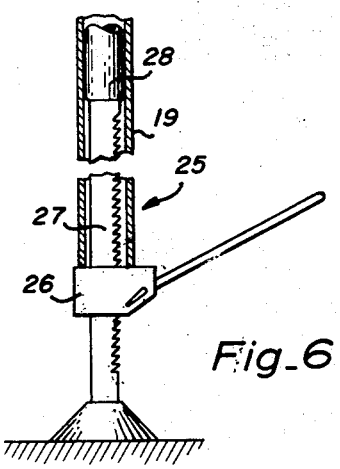
Fig_6
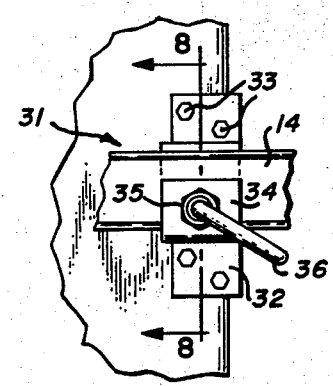
Fig_7
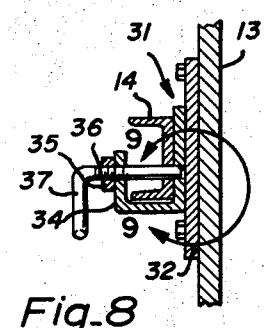
Fig_8

TRAILERABLE BOAT FOR A CAMPER AND METHOD FOR TRANSFERRING THE CAMPER

DESCRIPTION OF THE PRIOR ART

Heretofore, foldable and trailerable pontoon boats have been proposed. Examples of such boats are disclosed in U.S. Pat. No. 2,588,084, issued Mar. 4, 1952 and U.S. Pat. No. 3,099,977, issued Aug. 6, 1963. It is also been proposed with regard to folable pontoon boats, and collapsible pontoon boats in general, to load a camper body upon the boat to form a sort of houseboat. An example of such a camper type houseboat is disclosed in U.S. Pat. No. 3,436,774 issued April 8, 1969.

The problem with these prior art boats is that there has not been disclosed a practicable method for loading the camper body onto a foldable and trailerable boat nor has there been any teaching or suggestion for utilization of that portion of the deck below the cab-over portion of the camper body. More particularly, in one prior art, trailerable and foldable pontoon boat, the helm was located aft of the center region of the boat which was to receive the camper body. In such a case, steering of the boat, with the camper in place, is difficult due to obstruction of the pilots view due to the presence of the camper body forward of the helm. Such a prior art foldable boat is disclosed in co-pending U.S. application 112,857, filed Feb. 5, 1971, now issued as U.S. Pat. No. 3,763,511 on Oct. 9, 1973.

SUMMARY OF THE PRESENT INVENTION

The principal object of the present invention is the provision of an improved trailerable boat for campers and method and apparatus for transferring the camper to the trailered boat.

In one feature of the present invention, the camper body is lifted from the bed of the truck, the truck is removed from below the elevated camper body, the trailered boat is positioned below the elevated camper body, and the camper body is lowered into position on the trailered boat.

In another feature of the present invention, the camper body is lifted from the bed of the truck by means of four jacks coupled to the camper body, such jacks having their feet disposed substantially outboard of the camper body to allow the trailered boat to be drawn below the elevated camper body for transferring the camper body between the trailered boat and the bed of the truck.

In another feature of the present invention, a pair of elongated lifting beams are affixed to the camper body, such beams being longitudinally spaced and transversely directed of the camper body. Four jacks, one at each end of the beams, are provided for lifting the camper body from the bed of the truck.

In another feature of the present invention, the aforementioned lifting beams which are employed for lifting the camper body from the truck are also employed as integral structural elements of the boat by being detachably affixed across the bow and stern of the boat when the foldable pontoons are in their extended position.

In another feature of the present invention, a platform is centrally disposed of the main deck of the foldable pontoon boat to receive the camper body and to elevate the camper body above the deck of the foldable pontoon boat by an amount sufficient to facilitate access by the operator to the deck region below the cab-over portion of the camper as supported on the platform.

In another feature of the present invention, a collapsible helm is disposed generally below the cab-over portion of the camper body as supported from the foldable pontoon boat such as to provide a pilot house region partially protected from the elements by the cab-over portion of the camper body.

In another feature of the present invention, a collapsible wind screen structure at least partially encloses a pilot house region between the cab-over portion of the camper body and the main deck of the foldable pontoon boat.

In another feature of the present invention, the platform for supporting the camper body upon the deck of the foldable pontoon boat is provided with a plurality of seat portions such that when the pontoon boat is employed without the camper body, the platform may be utilized as seats for passengers.

Other features and advantages of the present invention will become apparent upon a perusal of the following specification taken in connection with the accompanying drawings wherein:

BRIEF DESCRIPTION OF THE DRAWINGS

FIG. 1 is side elevational view of a camper truck and trailered foldable pontoon boat incorporating features of the present invention, FIG. 2 is a sectional view of the structure of FIG. 1 taken along lines 2—2 in the direction of the arrows, FIG. 3 is a view similar to that of FIG. 2 depicting the pontoons of the foldable boat in their extended position, FIG. 4 is a view of the structure of FIG. 1 taken along lines 4—4 in the direction of the arrows and modified to show the pontoons in the extended position and the use of jacks for lifting the camper body from the truck, FIG. 5 is an enlarged detail view of a portion of the structure of FIG. 4 delineated by line 5—5, FIG. 6 is an enlarged detail view, partly in section, of a portion of the structure of FIG. 4 delineated by line 6—6, FIG. 7 is an enlarged detail view of a portion of the structure of FIG. 4 delineated by line 7—7, FIG. 8 is a sectional view of the structure of FIG. 7 taken along lines 8—8 in the direction of the arrows.

DESCRIPTION OF THE PREFERRED EMBODIMENTS

Figure 9:
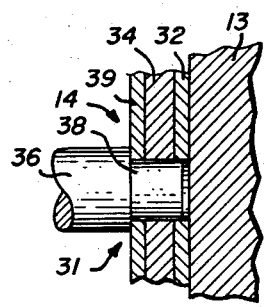
FIG. 9 is an enlarged detail sectional view of a portion of the structure of FIG. 8 delineated by line 9—9.

Referring now to FIG. 1, there is shown a camper truck 1 with a foldable pontoon boat 2 in tow upon a trailer 3. The pontoon boat 2 is preferably of the type disclosed and claimed in the aforecited co-pending U.S. application 112,857, now U.S. Pat. No. 3,762,511.

Referring now to FIGS. 2 and 3, the trailerable and foldable pontoon boat 2 is described in greater detail. The boat 2 includes a rectangular main deck section 5, as of 2 × 4 inches frame members, as of wood or aluminum, sandwiched between a ¾ inch thick sheet plywood upper deck member and a ½ inch thick plywood lower deck member. In a typical example, the main deck section 5 is 6 to 8 and preferably 8 feet wide and 24 to 30 feet long. A pair of elongated pontoons 6 extend longitudinally of the main deck 5 and are pivotably secured to the side marginal edge portions of the main deck 5 via the intermediary of a plurality of hinge members 7 more clearly shown in FIG. 17.

The pontoons 6 are pivotable from a folded position, shown in FIG. 2, to an unfolded or extended position shown in FIG. 3. The extended position is below and outboard of the folded position. The pontoons 6 are preferably of a square cross section as of 2 × 2 feet and constructed of ½ inch thick plywood on the sides and bottom with a ¾ inch thick plywood deck portion. Water tight bulkheads are provided at 4 feet intervals longitudinally of the pontoons to divide the pontoon into a plurality of water tight compartments. The outside of the pontoon is coated with fiberglass to increase the strength and to render the pontoons watertight.

A camper platform structure 8, as of 2 feet is height, 4 feet in width, and 10 feet long (more fully disclosed below with regard to FIGS. 10 and 11) is fixedly secured to the main deck 5 intermediate the pontoons 6. A winch 9 is detachably secured to the platform 8 and a cable 11 is attached to a lifting eye 12 secured to each pontoon 6 along the outer upper marginal side edge of the pontoon, when in the extended position. The cable is first attached to the lifting eye 12 when the pontoon is in the folded position as shown in FIG. 2. The winch is then employed to lift the pontoon to a position such that its center of gravity is above or near to a vertical line above the hinge 7. The operator then merely pushes the pontoon over the top dead center position and allows the pontoon to be lowered by gravity against the winch 9 to the unfolded or extended position as shown in FIG. 3. Similarly, when folding the pontoon, the cable 11 is attached to the eye 12 and the winch is employed to pivot the pontoon 6 about the hinge 7.

Figure 17:
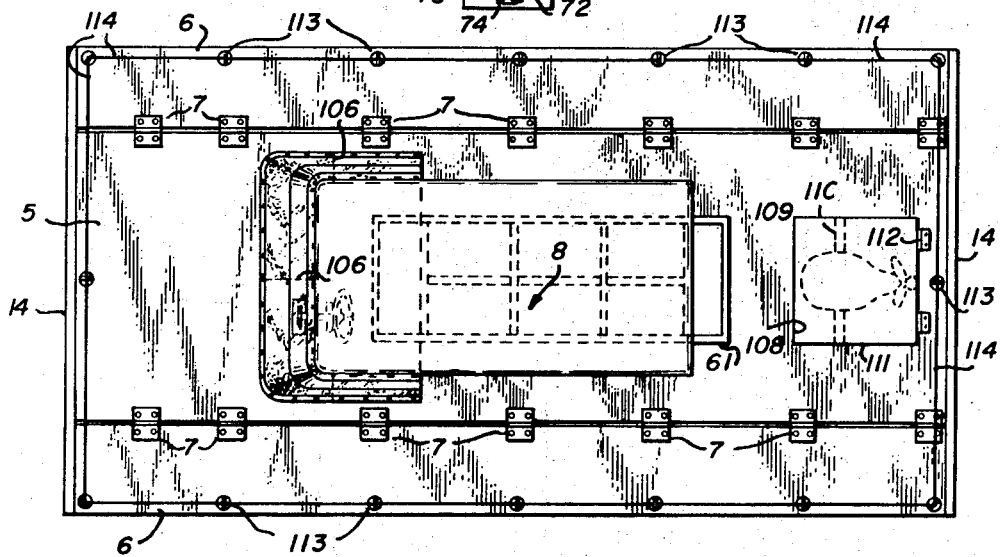
FIG. 17 is a top view of the foldable and trailerable pontoon boat incorporating features of the present invention.

The camper truck 1 (See FIG. 1) includes a camper body or box 13 carried in the bed of the camper truck 1. The camper body 13 is transferred from the bed of the truck 1 to the camper platform 8 by attaching a pair of lifting beams 14 across the camper body 13 at fore and aft positions 15 and 16, respectively, of the camper body 13. The lifting beams 14, as of 12 feet long 4 inches steel channel (see FIG. 4), each have a length substantially equal to the width of the foldable boat 2, when the boat is in the unfolded position, as shown in FIG. 3. In addition, the lifting beams 14 form an integral structurel element of the boat 2 and after their use for lifting the camper body they are employed as structural elements of the boat 2 by being secured, as by bolts, across the bow and stern, respectively of the boat 2, as shown in FIG. 17 and as disclosed in the aforecited U.S. App. No. 112,857. The ends of the lifting beams 14 are secured into mating ends of jack structures 17 for lifting the camper body 13 from the bed of the truck 1.

Referring now to FIGS. 4, 5 and 6, the jacks 17 will be described in greater detail. The upper end of the jack 17 includes a transverse channel member or lifting arm portion 18, such as a 5 inches steel channel member 2 feet long. The root portion of the arm 18 is fixedly secured, as by welding, to a vertical pipe section 19, such as a 1½ inches steel pipe. A steel bracket 21, as of ¼ inch thick steel plate is welded across the open side of the channel arm 18 and is centrally bored. A ½ inch steel nut is welded to the bracket 21 in alignment with the central bore therein. A ½ inch bolt 23 with a 6 inches L-handle 24 welded thereto is screwed into the nut 22 and serves as a set screw for holding the lifting arm 18 to the end of the lifting beam 14. The lifting arm 18 has a length sufficient such that there is about a 1 foot overlap between the two channels 14 and 18 and to provide approximately a one foot transverse extention to each end of the lifting beam 14 such that there is provided approximately a 1 foot clearance between the vertical member 19 of the jack 17 and the outboard side edge of the extended pontoons 6.

A conventional automotive bumper jack assembly 25 is inserted into the lower end of the vertical pipe 19 with the lower end of the pipe 19 resting on the traveling member 26 of the bumper jack 25. A vertical rack portion 27 of the bumper jack 25 is inserted within the hollow pipe 19 and a 1½ inches round steel bar 28 is welded to the upper end of the rack 27. The length of the rack portion 27 is preferably 3 to 4 feet long and the extension 28 is preferably 1 to 2 feet long, such that each of the bumper jacks may be employed for elevating the camper body by as much as 3 to 4 feet.

The lifting beams 14 are detachably secured to the camper body 13 via four lifting fittings disposed at the four corners of the camper body 13. The lifting fittings 31 are disclosed in detail in FIS. 7–9. More particularly, each lifting fitting 31 includes an angle member 32, such as a 2 inches steel angle 12 inches long, fixedly secured to the corner of the camper body 13 via a plurality of lag screws or bolts 33. A beam holding bracket 34 of generally J-cross section, as of ¼ inch steel plate, is fixedly secured to angle 32, as by welding. In an alternative embodiment, the beam holding bracket 34 may comprise a section of 5 inches channel with a bracket welded thereacross, as shown in FIG. 5, at 18 and 21.

The lower hook like portion of the beam holding bracket 34 serves to hold the beam 14 such that the operator need merely insert one end of the beam 14 in a bracket 34 and slide the lifting beam 14 across the width of the camper through the opposed lifting bracket 34 at the opposed corner of the camper body 13. The hook portion of the bracket 34 is centrally bored and a ½ inch nut 35 is welded to the outside of the bracket 34 in alignment with the bore. A ½ inch bolt 36 with an L-shaped handle 37 welded thereto is screwed through the nut 35 to function as a set screw.

More particularly, the inner end of the bolt 36 includes an outer recess at 38 and the threads are removed from the end portion of the bolt 36. The recessed portion 38 passes through aligned bores in the web portion 39 of the lifting channel 14 and in the bracket 34 and into the angle member 32. The bolt 36 clamps the lifting beam 14 to the holding bracket 34 and transfers the lifting force from the lifting beam 14 to the camper body via the intermediary of the holding bracket 34.

The camper body 13 is elevated 3 to 4 feet over the bed of the truck via the jacks 17 and lifting beams 14, such that the camper body 13 is elevated to a sufficient height to clear the top of the camper platform 8 as the truck 1 is pulled forward to tow the camper platform 8 under the elevated camper body 13.

Figure 10:
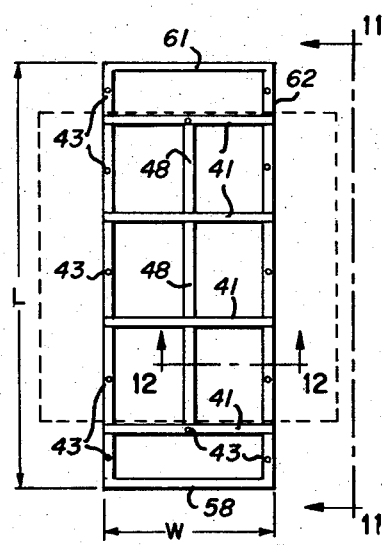
FIG. 10 is a plan view of a portion of the structure of FIG. 3 taken along line 10—10 in the direction of the arrows.
Figure 11:
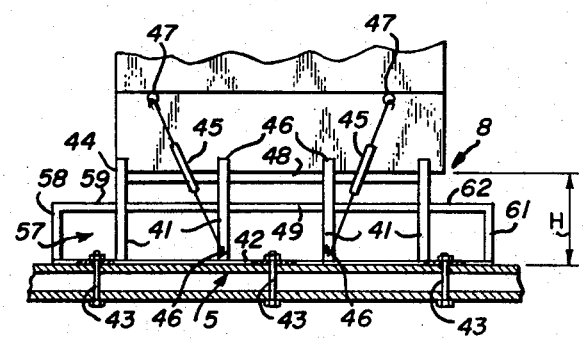
FIG. 11 is a side elevational view, partly in section, of the structure of FIG. 10 taken along lines 11—11 in the direction of the arrows.

Referring now to FIGS. 3, 10 and 11, the camper platform 8 is described in greater detail. More particularly, the camper platform 8 has a width $w$ of approximately 4 feet, a length of approximately 10 feet, and a height of approximately 2 feet above the deck 5. The camper platform is preferably constructed of 1½ inches steel angle welded together in the manner as shown in FIGS. 10 and 11. More particularly, four upstanding rectangular frame members 41 are welded transversely of a pair of longitudinally directed 1½ inches angles 42 laying on and fixedly secured to the deck 5 via the intermediary of eight ⅜ inch bolts 43 passing through the deck 5. The web of the angle on the top cross member of the foremost frame 41 is turned up, whereas the remaining webs of the top cross members of frames 41 are turned down along the top of the platform 8. About a 2 inches length of the web of the vertical members of the frames 41 extend, at 44, above the level of the platform 8 to cooperate with the upturned web on the foremost cross member to provide front and side lips to the platform for retaining the camper body on the top of the platform 8.

In addition, four turnbuckles 45 of conventional design are secured between eyes 46 in the platform 8 and eyes 47 fixedly secured to the camper body for holding the camper body to the platform 8. A steel angle 48 runs longitudinally along the frames 41 centrally of the platform 8 for interconnecting the top sides of each of the rectangular frame members 41. Longitudinal member 48 also serves to provide a back rest for a seat structure more fully described below with regard to FIG. 12. Frame members 41 are interconnected at seat level, as of 18 inches above the deck 5, along each side of the platform 8 via a plurality of steel angle sections 49.

Figure 12:
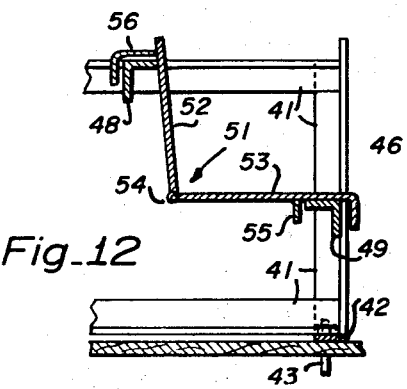
FIG. 12 is a sectional view of the structure of FIG. 10 taken along lines 12—12 in the direction of the arrows and modified to incorporate a foldable seat.

A plurality of seat structures 51, as more clearly shown in FIG. 12, are to be positioned between the frame members 41 to provide six seats for passengers when the foldable pontoon boat 2 is not utilized with a camper body 13. The seat structure 51 includes two rectangular sheet plywood members 52 and 53 hinged together via hinge 54 to provide a back rest and seat portion, respectively. The underneath side of the front lip of the seat portion 53 includes a steel channel bracket 55 affixed thereto which clamps over the longitudinal side members 49. The back rest portion 52 includes a hook member 56 affixed thereto which is hooked over the longitudinal center members 48. When the boat 2 is to be employed with a camper body 13, the seats 51 are folded up and stored below the platform 8.

The foremost portion of the camper platform 8 includes a pilot house seat portion 57 formed by an upstanding front rectangular frame member 58 having a height substantially equal to the height of the horizontal members 49, as of 18 inches from the deck. The front frame member 58 is fixedly secured as by welding to the longitudinal base members 42 and is interconnected along the sides at the top of the seat via longitudianl members 59. The seat portion 57 has a depth, as of 18 inches. Likewise a similar frame member consisting of an upstanding transverse rectangular frame structure 61 and side members 62 is fixedly secured, as by welding, at the rear of the camper platform 8 to form a step structure to facilitate access to the elevated camper body from the main deck 5.

Referring now to FIGS. 13–17, the pilot house portion of the boat 2 is more fully disclosed. The pilot house portion of the boat is defined by that region of the boat below the overhanging cab-over portion 65 of the camper body 13, as supported upon the platform 8 on the boat. This region is generally indicated at 66. The pilot house region 66 includes a collapsible helm structure 67 which is pivotably supported from the main deck 5 in such a manner that the helm may be pushed over generally parallel to the deck 5 to facilitate clearance for the camper body 13 as it is being transferred to or from the camper platform structure 8.

The collapsible helm 67 includes a vertically directed channel member 68, as of 3 inches steel channel, fixedly secured at its lower end, as by welding, to a transversly directed tubular member 69, as of ½ inch pipe, 6 inches long. A ¼ inch thick steel plate 71 is fixedly secured to the deck 5, as by screws, and two relatively short sections of ½ inch pipe 72 are fixedly secured to the plate 71 as by welding. The bores of the pipes 72 are in alignment and they are axially spaced apart by approximately 6 inches to accommodate the pipe section 69 fixed to the channel 68. A ⅝ inch diameter 11 inches long pin 73 is inserted through the aligned pipe sections 69 and 72 and pinned in place via removable pins 74.

Figure 13:
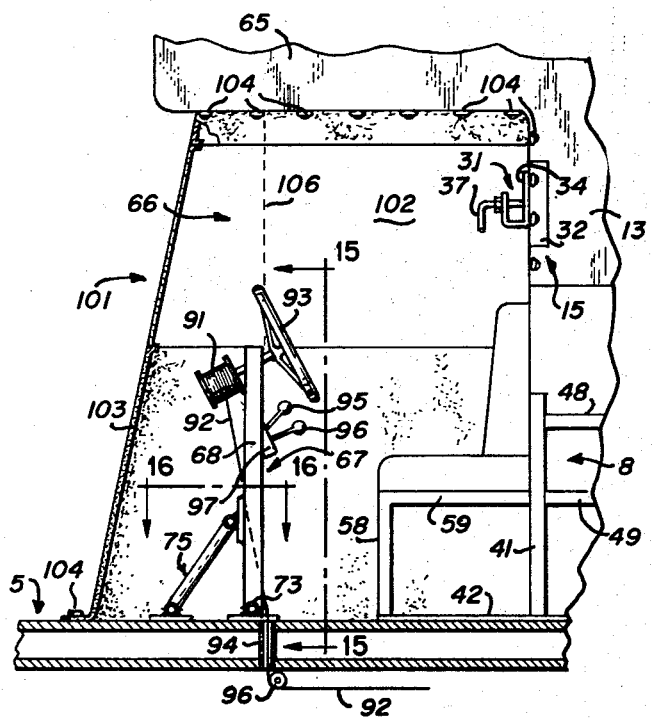
FIG. 13 is an enlarged side view, partly in section, of the cab-over portion of the camper body as mounted on the foldable pontoon boat and depicting the collapsible helm and the wind screen portions of the pilot house.
Figure 16:
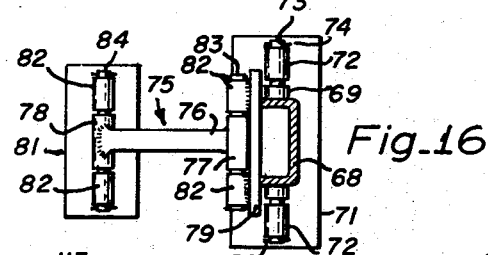
FIG. 16 is a view of a portion of the structure of FIG. 13 taken along lines 16—16 in the direction of the arrows.

A bracing strut structure 75, more clearly shown in FIGS. 13 and 16, serves to brace the channel 68 to the main deck 5. More particularly, the brace structure 75 includes a length of ¾ inch pipe 76, as of 16 inches in length, having two 3 inches long sections of ½ inch pipe 77 and 78 welded across opposite ends of the pipe 76. Two hinge plates 79 and 81, as of 6 inches in length and ¼ inch thick steel, are secured to the channel 68, as by welding, and to the deck 5, as by screws. The hinge plates 79 and 81 each include a pair of axially aligned and axially spaced relatively short ½ inch pipe sections 82 secured to the plates 79 and 81, as by welding. A pair of pins 83 and 84 pass through the aligned sections of pipe for pivotably securing the strut structure between the channel 68 and the deck 5. The channel 68 is collapsed against the deck 1 by removing either pin 83 or 84 and pivoting the members 68 and 75 toward the deck 5.

A drum 91 (See FIGS. 13 and 15) having a steering cable 92 wound thereon is attached to a steering wheel 93. The steering cable 92 passes through a tube 94 in the deck 5 and around a pulley 96 to the outboard motor for pivoting the motor to steer the boat 2. Throttle and gear levers 95 and 96 are affixed to a bracket 97 which is secured to the channel 68, as be welding. The gear and throttle levers 95 and 96 are connected to the gear shift lever and to the throttle linkage of the motor via the intermediary of armored cables, not shown, passing through the tube 94 in the deck 5 to the motor.

Figure 14:
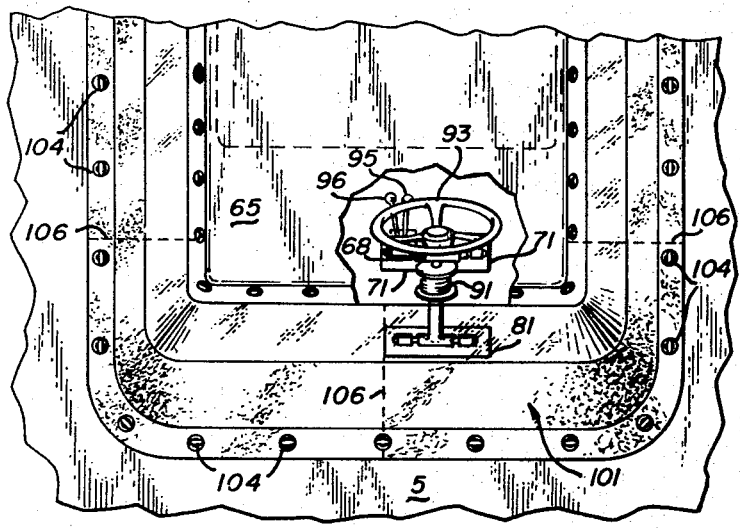
FIG. 14 is a top view of the structure of FIG. 13, partially broken away, to show the top view of the collapsible helm.
Figure 15:
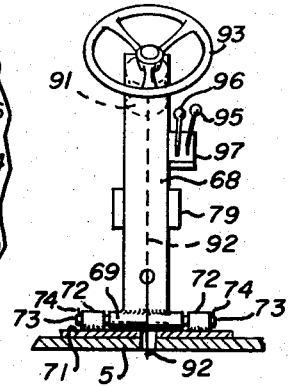
FIG. 15 is a view of a portion of the structure of FIG. 13 taken along lines 15—15 in the direction of the arrows.

Referring now to FIGS. 13, 14 and 17, a wind screen structure 101 for the pilot house 66 is shown in greater detail. The wind screen structure 101 is interconnected between the outer marginal edge of the underside of the cab-over portion 65 of the camper body 13 and the main deck 5. In one embodiment, the wind screen structure 101 includes a transparent pliable window section 102, as of clear sheet plastic, secured into a heavy canvass sheet 103 which is fixedly secured by detachable fasteners 104 disposed about the periphery of the wind screen structure 101. More particularly, the detachable fasteners 104 comprise, for example, twist lock fasteners secured, as by screws, to the lower side edges of the cab-over portion 65 and to the sides of the camper body 13 as well as to the deck 5 about the perimeter of the lower edge of the wind screen 101. Suitable eyelets are provided about the periphery of the wind screen 101 for cooperation with the twist lock fasteners 104. As an alternative to the use of the canvass wind screen 101, the wind screen is made of molded fiberglass employing plexiglass windows 102. The fiberglass wind screen member is hinged together by means of a plurality of generally vertically directed piano hinges, as of three hinges, indicated by dotted lines 106 in FIGS. 13, 14 and 17.

Referring now to FIG. 17, the after end of the main deck 5 includes an engine well 108 having an outboard motor 109 mounted therein by being affixed to a cross mounting member 110 secured across the well 108 below the level of the deck 5. An engine housing 111, as of 2 feet in height, is hinged to the deck 5 at 112 such that the housing 111 may be swung back for access to the engine well 108. A plurality of pipe stanchions 113 are threaded on one end and include an eye on the other. The stanchions 113 are screwed into threaded sockets about the marginal edge of the deck 5 and pontoons 6 and a guard rope 114 is strung through the eyelets of the stanchions.

Referring now to FIGS. 1, 2 and 3, the trailer structure 3 is shown. The trailer 3 includes a box frame structure 115 supporting two longitudinal runners 116 which support the underside of the main deck of the boat 2. Two guide runners 117 are fixedly secured to the underside of the deck 5 to assure that the boat is properly centered on the trailer runners 116. The box frame support is sprung from the tandem axles 118 via coil springs 119. The tongue of the trailer 121 is coupled to the frame of the truck 1 via a conventional ball and socket coupling connector 122. A winch 123 is carried from the tongue 121 via a frame 124 and the winch includes a cable 125 which is affixed to the bow of the boat 2 for winching the boat onto the trailer 3.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an apparatus for transferring a camper body between a truck bed and a trailered foldable pontoon boat, lifting means having foot portions to be positioned on the ground outboard of the camper body for lifting the camper body free of the truck bed and to a height above the deck of the trailered boat, said lifting means including means for spacing said foot portions apart by a width, taken in the transverse direction of the camper body, to accommodate the width of the pontoon boat with the pontoons of the boat in the unfolded extended position, said lifting means including, a pair of lifting beams, means for detachably affixing said lifting beams transversely of and to the camper body at positions longitudinally spaced of the camper body, and wherein said lifting means includes four jacks one each coupled to respective ends of said pair of lifting beams for lifting the camper body from the bed of the truck.

2. The apparatus of claim 1 including means for detachably securing said lifting beams across the bow and stern respectively of the foldable pontoon boat as an integral structural element of the boat, when the pontoons are in the unfolded extended position, for rigidily holding the pontoons in the extended position.

3. The apparatus of claim 1 wherein said means for detachably securing said lifting beams to said camper body includes, a plurality of lifting fittings secured to said camper body, and each of said lifting fittings including a lower hook portion outwardly extending from the camper for receiving one of said lifting beams.

4. The apparatus of claim 1 wherein each of said jacks includes an elongated section to be vertically directed from said foot portion and a horizontal lifting arm section, and means for detachably securing said lifting arm section of said jack to a respective end of said lifting beam.

5. The apparatus of claim 4 wherein each of said lifting beams comprises a channel beam.

6. In a foldable pontoon boat, a main deck structure, a pair of generally parallel elongated pontoons extending along opposite side edges of said main deck structure, means for rotating each pontoon about an axis extending longitudinally of said main deck structure, each of said pontoons being rotatable about said axis of rotation between a folded position and an extended position, said extended position being outboard of the folded position, platform means disposed on said main deck structure for receiving and for supporting a camper body with the base floor of the camper body substantially above the level of said main deck structure, whereby the cab-over portion, if any, of camper body is elevated above said main deck structure to facilitate access by the operator to the deck region below the cab-over portion of the camper as supported on said platform.

7. The apparatus of claim 6 includin seat means disposed at the forward end of said platform means, whereby the operator as seated on said seat is at least partially protected from the elements by the cab-over portion, if any, of the camper body when the camper body is in place on said platform means.

8. The apparatus of claim 6 including, helm means disposed forward of said platform generally beneath the cab-over portion, if any, of the camper body when the camper body is in place on said platform.

9. The apparatus of claim 8 including means for collapsing said helm substantially toward said deck to facilitate placement of the camper body on said platform.

10. The apparatus of claim 8 including, collapsible wind screen means disposed forward of said helm for protecting a pilot house region of the boat which includes said helm.

11. The apparatus of claim 10 including means for fastening the upper marginal edge of said wind screen means, when erected, to the camper body, when the camper body is in place on said platform means.

12. The apparatus of claim 9 wherein said means for collapsing said helm includes, pivot means for pivoting at least a portion of said helm means toward the level of said deck structure to provide increased clearance forward of said platform which receives the camper body.

13. The apparatus of claim 6 wherein said platform means supports said camper body with the base floor of the camper body at least 12 inches above the upper surface of said main deck structure.

14. The apparatus of claim 6 including, means for fixedly securing the camper body to said platform means.

15. The apparatus of claim 6 including seat means formed in and along opposite sides of said platform, whereby said platform may be employed for seating passengers when the camper body is not in place on the boat.

16. In a pontoon boat, a main deck structure, a pair of generally parallel laterally extendable elongated pontoons extending along opposite side edges of said main deck structure, platform means disposed on said main deck structure and being dimensioned for receiving and for supporting a camper body with the base floor of the camper body substantially above the level of said main deck structure, said main deck and pontoons in the laterally extended position forming a lateral extension of the main deck and being dimensioned to provide room for passengers to walk around the camper body when supported upon said platform, whereby the cab-over portion, if any, of the camper body is elevated above said main deck structure to facilitate access by the operator to the deck region below the cab-over portion of the camper as supported on said platform.

17. The apparatus of claim 16 including seat means disposed at the forward end of said platform, whereby, the operator as seated on said seat is at least partially protected from the elements by the cab-over portion, if any, of the camper body when the camper body is in place on said platform.

18. The apparatus of claim 16 including, helm means disposed forward of said platform generally beneath the cab-over portion, if any, of the camper body when the camper body is in place on said platform.

19. The apparatus of claim 18 including, wind screen means disposed forward of said helm for protecting a pilot house region of the boat which includes said helm.

20. The apparatus of claim 19 including means for fastening the upper marginal edge of said wind screen means, when erected, to the camper body, when the camper body is in place on said platform means.

21. The apparatus of claim 16 wherein said platform means supports said camper body with the base floor of the camper body at least 12 inches above the upper surface of said main deck structure.

22. The apparatus of claim 16 including, camper body means, and means for fixedly securing said camper body to said platform means.

23. The apparatus of claim 16 including seat means formed in and along opposite sides of said platform, whereby said platform may be employed for seating passengers when the camper body is not in place on the boat.

24. In a method for transferring a camper body from a truck bed to a trailered foldable pontoon boat having a main deck structure with a pair of pontoons mounted to the opposite side edges of the deck, such pontoons being pivotable about at least one axis directed longitudinally of the boat between a folded position inboard of an extended position, the steps of, attaching a pair of elongated lifting beams to the camper body with the lifting beams being spaced apart longitudinally of the camper body and extending transversely of the camper body, coupling four jacks to the respective ends of said lifting beams with the feet of the jacks being positioned on the ground and being spaced substantially outboard of the camper body and trailered boat, jacking the camper body free of the truck bed to a height above the level of the deck of the trailered boat, removing the truck from below the elevated camper body, positioning the trailered boat under the elevated camper body, lowering the camper body into position onto the trailered boat, and detaching the lifting beams from the camper body and jacks, and detachably securing the lifting beams across the bow and stern respectively of the foldable pontoon boat as an integral structural element of the boat for rigidly holding the pontoons in the extended position.

* * * * *